INVENTOR
EDGARD BRICHARD
BY
Drayton R. Stemple, Jr.
John J. Hart
ATTORNEYS

Jan. 25, 1966   E. BRICHARD   3,231,351
METHOD OF AND APPARATUS FOR THE THERMAL CONDITIONING
OF MOLTEN GLASS BEFORE ITS SHAPING
Filed June 9, 1961   5 Sheets-Sheet 2
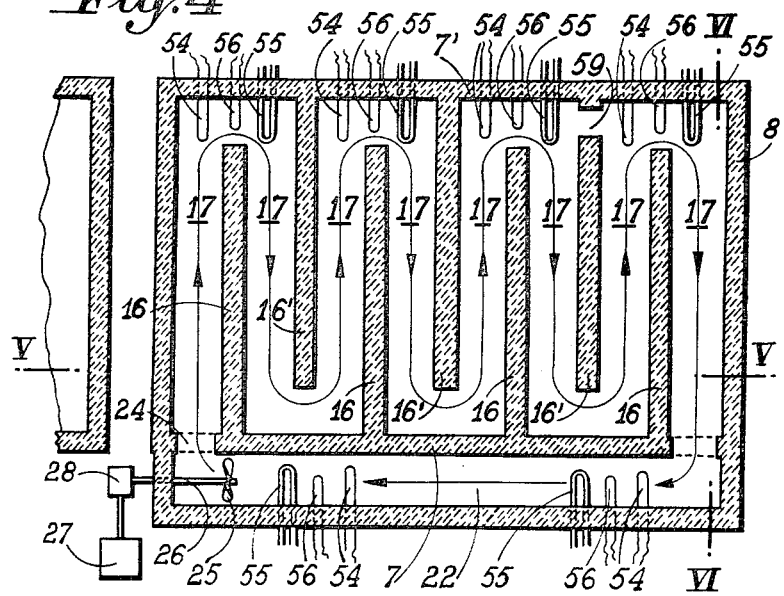
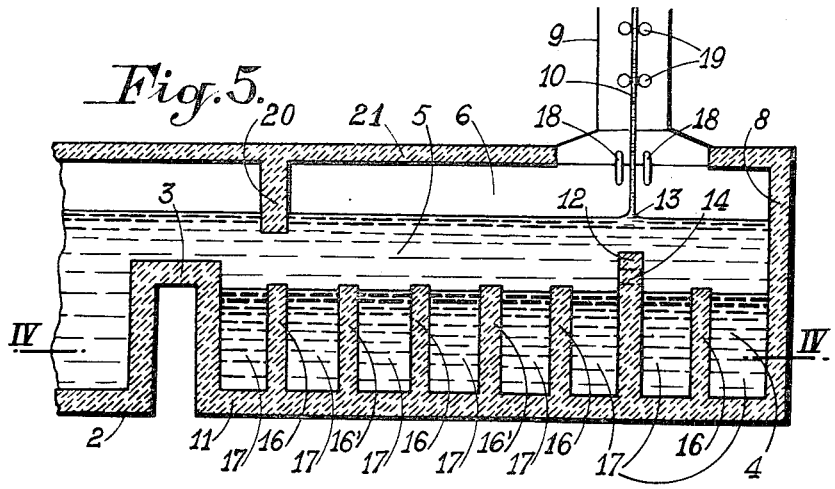
INVENTOR
EDGARD BRICHARD
BY
Dayton R. Stemple, Jr.
John J. Hart
Attorneys Jan. 25, 1966 E. BRICHARD 3,231,351
METHOD OF AND APPARATUS FOR THE THERMAL CONDITIONING
OF MOLTEN GLASS BEFORE ITS SHAPING
Filed June 9, 1961 5 Sheets-Sheet 3
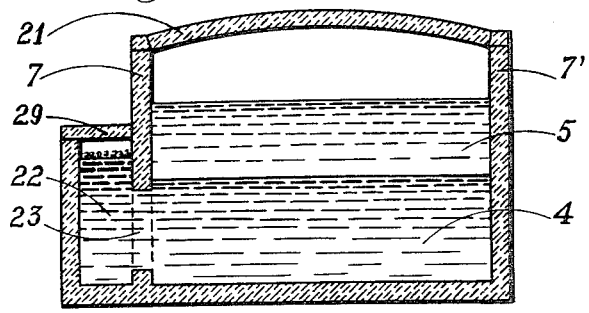
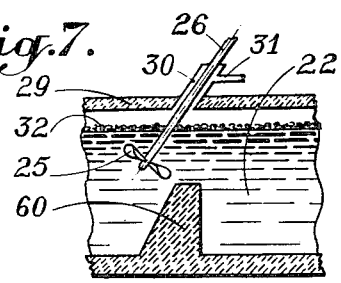 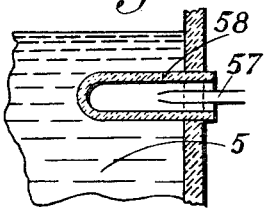
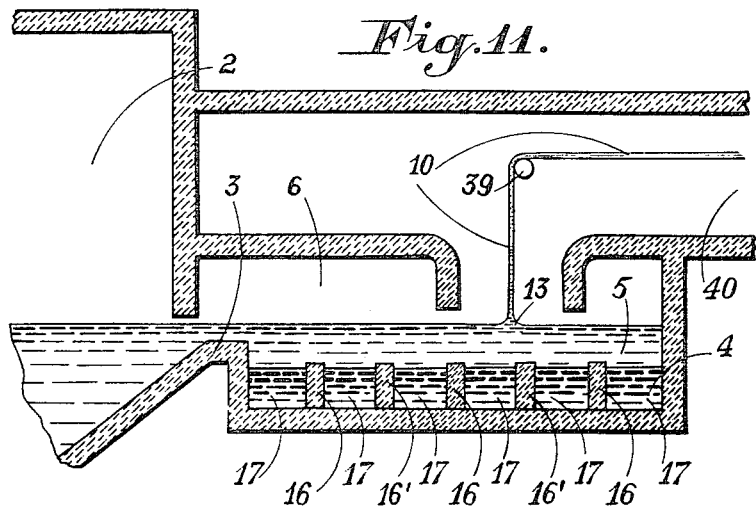
INVENTOR
EDGARD BRICHARD
BY
ATTORNEYS

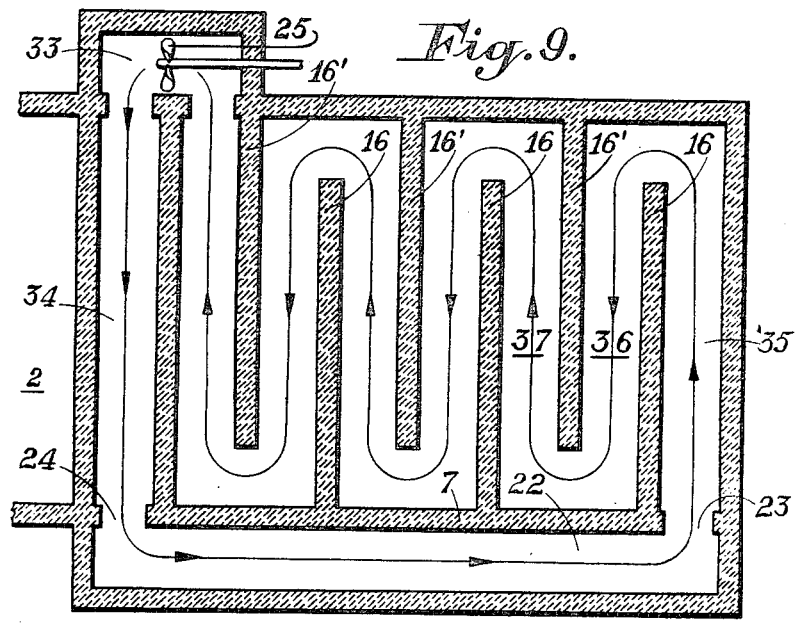
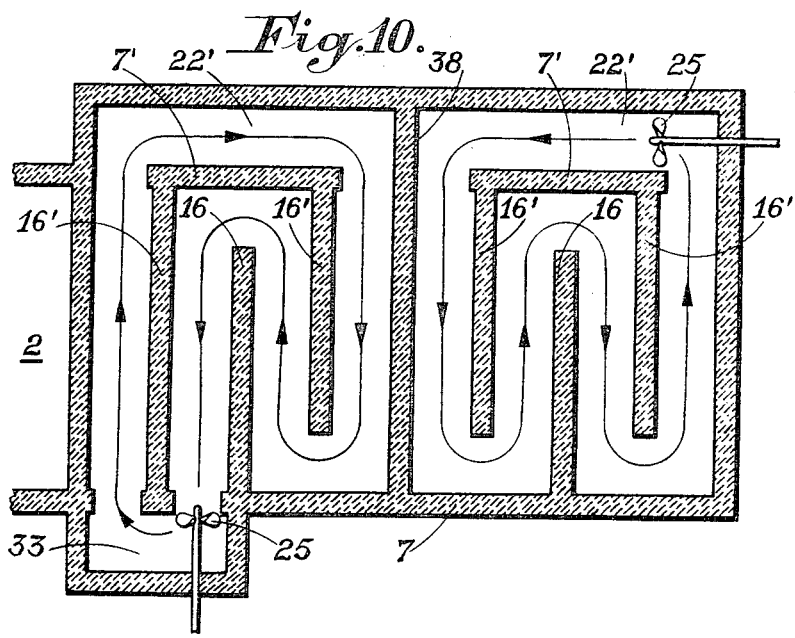

Jan. 25, 1966

E. BRICHARD 3,231,351

METHOD OF AND APPARATUS FOR THE THERMAL CONDITIONING
OF MOLTEN GLASS BEFORE ITS SHAPING

Filed June 9, 1961

INVENTOR
EDGARD BRICHARD
BY
Dayton R. Stemple, Jr.
John J. Hart
ATTORNEYS 3,231,351
METHOD OF AND APPARATUS FOR THE THERMAL CONDITIONING OF MOLTEN GLASS BEFORE ITS SHAPING
Edgard Brichard, Jumet, Belgium, assignor to Glaverbel, Brussels, Belgium, a Belgian company
Filed June 9, 1961, Ser. No. 116,176
Claims priority, application Belgium, June 28, 1960, 470,591; July 15, 1960, Patent 592,381
5 Claims. (Cl. 65—85)

The present invention relates to a method of and an apparatus for thermally conditioning molten glass before it is extracted for the purpose of shaping, and is applicable inter alia to the treatment of window glass before it is drawn.

It is known that the hot shaping of glass objects can be carried out only at a particular temperature, notably below that which is required for the refining of the glass. In addition, this temperature must be very uniform at the point of extraction and throughout the neighbouring zone. In the drawing of the glass into sheet form, it is also necessary for the thermal currents to be sufficiently impeded below the drawing line, that is to say, below the gather or meniscus feeding the sheet being formed, in order that the drawing line may retain a stable position and a completely rectilinear course.

In current practice, the cooling of the glass takes place in the course of a long travel between the refining zone and the working point. In the course of this travel, the glass deteriorates and becomes charged with impurities. Thus, it is necessary to allow thermal currents to return the greater part of the glass to the melting zone in order to re-purify it at high temperature. This results in a considerable loss of heat.

The working zone is also the centre of considerable heat losses, which must be compensated for. The necessary supply of heat takes place directly by external heating in some methods. In other methods, it results from an amplification of the current supplying the hot glass, which current returns to the melting point in a continuous cycle after having given up its sensible heat. The heat currents, if well controlled, contribute to maintaining a uniform temperature throughout the drawing bath at an appropriate level for good operation.

However, these currents as a whole bring about a considerable loss of heat and make it necessary to increase the dimensions of the furnaces.

The method of the invention obviates these disadvantages and affords the advantages of permitting the travel of the molten glass towards its point of extraction without being contaminated by impurities, of reducing to a large extent the currents returning from the glass towards the tank furnace, or even of completely eliminating these currents, and of creating on either side of the point of extraction a wide zone at constant temperature well suitable for the shaping of the glass.

For this purpose, the molten glass is advanced towards a subjacent bath of molten material capable of taking up heat from the glass at a point at which the glass is to be cooled and of restoring it thereto at another point at which it is to be heated.

In some cases, the heat exchange between the molten glass and the subjacent bath can take place merely under the effect of the thermal conductivity of the molten material and of the convection currents set up within the subjacent bath. In other cases, it is advantageous to set in motion the molten material of the subjacent bath, preferably by mechanical means, and to cause it to move either in a single closed circuit or in a number of separate closed circuits. The linear speed of the advance of the molten material is higher than that of the advance of the molten glass to the subjacent bath and is advantageously made as high as is compatible with an appropriate heat exchange between the glass and the subjacent bath. This exchange may be intensified by cooling or heating means immersed in the subjacent bath.

The molten material of the subjacent bath is preferably of metallic nature and is advantageously molten tin or lead or an alloy of one of these metals having a sufficiently low melting point to constitute at the temperature at which the molten glass is extracted a highly mobile liquid, such as an alloy with copper.

An apparatus for carrying out the described method comprises essentially a trough designed to be able to contain a layer of molten material constituting the subjacent bath on which the molten glass readily travels while cooling towards the point of extraction for the purpose of its shaping. The thermal conditioning of the molten glass can be effected solely under the combined action of the thermal conductivity of the molten material and of the convection currents set up within the subjacent bath, but the apparatus is preferably provided with one or more means capable of circulating the molten material of the subjacent bath.

A vertical rib is advantageously provided on the base of the trough when the latter is surmounted by a device for drawing the glass into sheet form. This rib extends through the bath of molten material and into the layer of molten glass, below the drawing gather, for the purpose of maintaining the latter in the required position and in a straight line. It is also possible to dispose therein a debiteuse in a drawing apparatus employed in the Fourcault process.

In addition, the apparatus according to the invention comprises on the base of the trough vertical ribs emerging slightly from the subjacent bath of molten material and disposed in such manner as to constitute baffles extending along the path of the molten material of the subjacent bath in relation to that of the molten glass and to compartment the space of the trough which is occupied by the subjacent bath. The baffles are advantageously disposed perpendicularly to the path of travel of the molten glass and alternately fast with the opposite side walls of the trough.

The apparatus may comprise one or more external covered channels adjacent a side wall of the trough and connected with the interior of the latter by apertures formed in the said wall below the level of the subjacent bath, so as to form with the compartments defined by the baffles either a single closed circuit or a number of closed circuits. In the latter case, one of the circuits may be designed, for example, to adjust the gradual cooling of the molten glass travelling towards the extraction zone, and another to stabilise the temperature of the glass in the extraction zone.

The means for circulating the molten glass of the subjacent bath preferably consist of a mechanical propelling device, such as a screw immersed in the said material, of which the driving shaft extends through a wall of the device and is controlled by a variable-speed motor. The driving shaft may be obliquely disposed and may extend through the wall of the trough or of the outer channel above the level of the molten glass, for example the roof of the channel. The channel advantageously comprises a barrier disposed upstream of the inclined screw for the purpose of reducing the cross-section of the molten material substantially to the cross-sectional area beaten by the screw. In a modified form, the driving shaft is vertical and supports a rotating screw about mid-way of the height of the layer of molten material in a horizontal plane, between an upstream screen descending into the molten material to the level of the said horizontal plane, and a barrier downstream of the screw and rising from the base of the channel to the said level. In order to protect the driving shaft from corrosion, it is surrounded by a casing let into the wall or into the roof and fed with a neutral or reducing gas, which may also be propagated into the space between the surface of the molten material and the ceiling of the external channel and place the said space under a slight superatmospheric pressure in order to prevent the entry of air. The molten material may in addition be protected from oxidation by means of granulated carbon covering its surface during its passage through a channel.

The apparatus according to the invention also comprises additional heating or cooling means, preferably immersed in one of the liquid materials in the trough. A heating means may consist of an electrical resistor immersed in the molten material of the subjacent bath or, when this material is of metallic nature, it may be formed by the resistance of the bath between two electrodes disposed therein. However, additional heating may be provided by means of gas burners disposed in casings having a closed end and immersed in the molten material of the subjacent bath or an additional heating or cooling means comprising a hairpin duct immersed in the molten material of the subjacent bath and fed from the outside with an appropriate heating or cooling fluid.

The described apparatus has the advantage that it can be readily combined with any of the known apparatus for drawing glass in sheet form, such as the apparatus of the Fourcault, Pittsburgh or Libbey-Owens type. It is also applicable with advantage to a feeder which feeds a machine for the automatic manufacture of pressed or blown glass articles, as also to the solution of any glass-making problem in which it is advantageous to obtain a uniform temperature distribution and in general to make use of any of the features mentioned or described. This is also the case, for example, with processes utilising the property of molten and superheated glass of spreading in a thin uniform layer over a metal bath.

A number of embodiments of the invention are illustrated by way of example in the accompanying drawings.

FIGURE 4 is a horizontal section along the line IV—IV of FIGURE 5 through a baffle system extending along the path of the molten material of the subjacent bath.

FIGURE 5 is a vertical section therethrough along the line V—V of FIGURE 4, and

FIGURE 6 is a vertical section along the line VI—VI of FIGURE 4.

FIGURES 7 and 8 relate to constructional details,

FIGURES 9 and 10 illustrate possible methods of circulating the molten material of the subjacent bath in one or two closed circuits.

Figure 12:
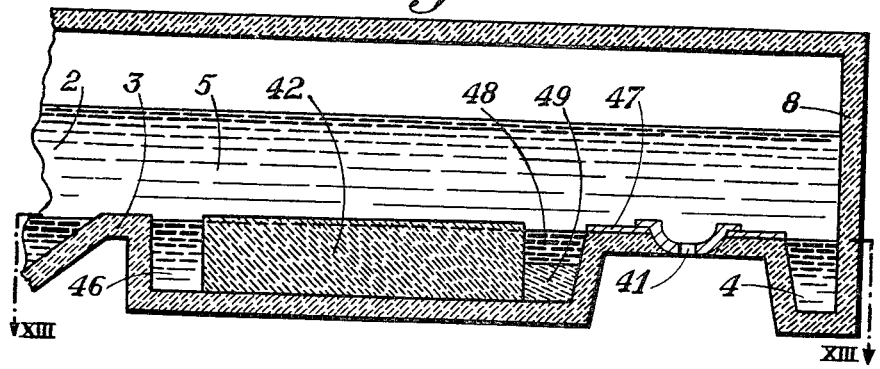
Figure 13:
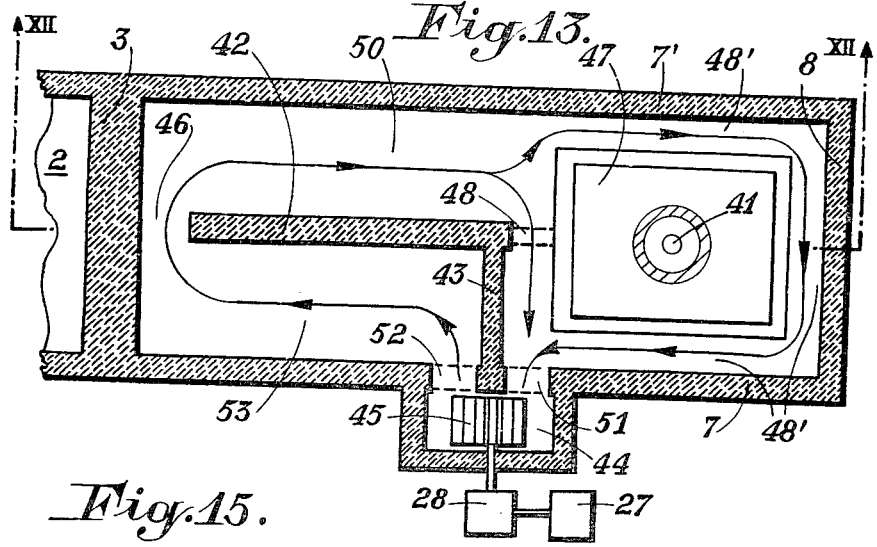

FIGURE 11 illustrates an application of the invention to the Libbey-Owens device for drawing glass into sheets, FIGURES 12 and 13 illustrate an application to the feeders which feed apparatus for the automatic production of pressed or blown glass objects, FIGURE 12 being a section along the lines XII—XII of FIGURE 13 and FIGURE 13 being a section along the line XIII—XIII of FIGURE 12, and FIGURES 14 and 15 again relate to constructional details.

Figure 1:
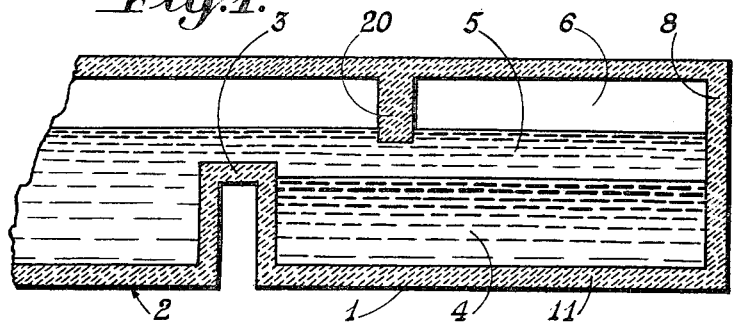
FIGURE 1 is a vertical longitudinal section through a trough containing molten material constituting the subjacent bath over which the molten glass travels towards the extraction point.

As illustrated in FIGURE 1, the invention consists essentially in providing in a trough associated with the furnace 2 for melting the glass and separated from the latter by a sill 3, a molten material constituting a subjacent bath 4 over which there travels the pool of molten glass 5 coming from the furnace 2 and proceeding towards the chamber 6 in which is disposed the station for the extraction of the glass (not shown in the figure).

The level of the bath 4 is lower than that of the sill 3. This bath consists of a material whose melting point is substantially lower than the temperature at which the glass is to be maintained in the chamber 6 for extraction and shaping. On the other hand, the material of the bath 4 must also have a negligible vapour pressure and be inert to the glass in order not to modify its composition in any way. Generally, the molten material will be a molten material will be a metal or an alloy of low melting point, for example tin, lead or an alloy of one of these metals with another metal, such as copper. It is obvious that the travel of the glass over the very mobile bath 4 is much easier and more uniform than it would be on a rough base of ceramic material. However, the use of this bath is fully justified by the fact that it permits a ready thermal conditioning of the molten glass, the extraction temperature of which is sometimes lower than the melting temperature obtaining in the furnace, and the temperature of which in the extraction zone must be as uniform as possible and accurately adjustable. The bath 4 has a favourable effect in this respect by reason of its high thermal conductivity and the convection currents set up within it. These currents by themselves effect remarkable thermal conditioning of the molten glass, permitting a gradual cooling of the latter during its travel from the sill 3 to the point of extraction in the chamber 6. The surface of the bath 4, which is constantly renewed by the convection currents, withdraws heat from the glass, which heat is returned to it at the place at which its temperature is to be maintained stable. These effects can be intensified when the molten material of the bath is actuated with an artificial circulatory movement, as hereinafter explained.

Figure 2:
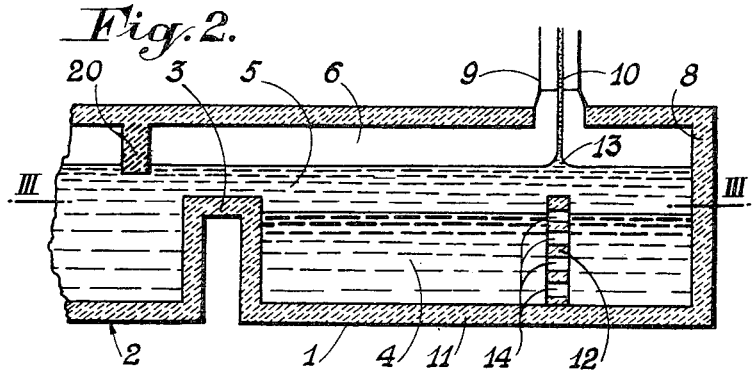
FIGURES 2 and 3 illustrate a trough designed for the drawing of glass into sheet form, FIGURE 2 in section along the line II—II of FIGURE 3, and FIGURE 3 along the line III—III of FIGURE 2.
Figure 3:
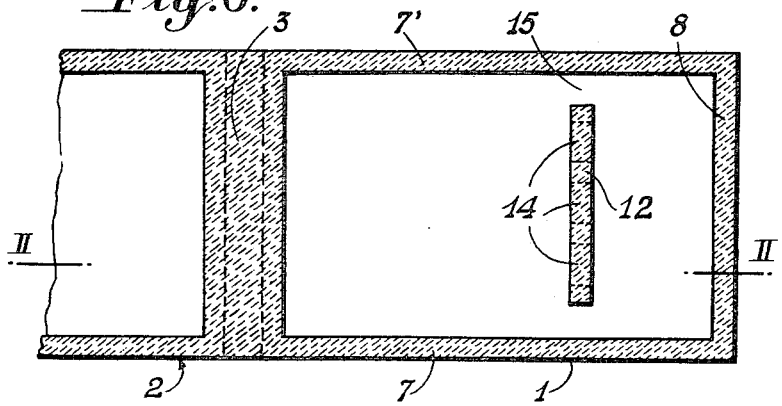

The trough 1 is bounded on the one hand by the sill 3 and on the other hand by the side walls 7 and 7', as also by the end wall 8 (FIGURES 1 to 3). When the extraction of the glass is effected by means of a device 9 (FIGURE 2) for drawing it into the form of a sheet 10, it may be desirable to provide on the base 11 a vertical rib 12 which extends across the bath 4 and penetrates into the sheet of molten glass 5 to form a drawing bar intended to maintain the gather 13 in position and in a straight line. The said rib may be formed with apertures 14 for the passage of the molten material of the bath 4. The latter may in addition pass through spaces 15 and 16 between the rib 12 and the walls 7 and 7'. If the thickness of the glass sheet 5 is reduced and reaches only 10 to about 30 cm., it is possible in some cases to stabilise the gather without the aid of the rib 12, but in the case of thicker glass sheets the presence of this rib is advantageous even indispensable.

The fact that the glass sheet is given the thickness most compatible with the conditions which must be satisfied for a good manufacture is advantageous in that it renders more effective the reserve supply of heat constituted by the molten material, and renders more rapid the regulating effect of the latter on the conditioning of the temperature of the molten glass. When the molten material is a metal, this effect is accentuated by reason of the fact that its surface is bright and does not radiate to any great extent, while the coefficient of radiation of the glass is high. The radiation of the metallic surface, however, is sufficiently intense to produce, in combination with the contact effect, a rapid conditioning of the temperature of the molten glass throughout the thickness of the bath of small thickness and to cancel out the effect of the cooling by convection to which the surface of the glass is exposed, but not the surface of the subjacent bath of molten material.

In order to facilitate the heat exchange between the glass pool 5 and the subjacent bath 4 at particularly important points, it is advantageous to subdivide into compartments that portion of the trough which is occupied by the bath 4, by means of vertical ribs 16 and 16' (FIGURES 4 and 5) constituting baffles which constrain the molten material to travel along a predetermined path, for example perpendicularly to the path of the molten glass 5. The baffles 16 and 16' slightly extend above the level of the bath 4 and are advantageously fast with the side wall 7 and with the sidewall 7', respectively, of the trough so as to form a series of compartments 17 which intercommunicate alternately on the side of the wall 7 and on the side of the wall 7'.

FIGURES 4 and 5 again illustrate a trough on which is mounted a device 9 for vertically drawing the glass into sheets 10. In these figures, there are shown cooling members 18 on either side of the drawn sheet and pairs of driving rollers 19. There will also be seen therein the barrier 20 descending from the roof 21 and dipping into the pool of glass so as to separate the atmosphere of the chamber 6 from that of the furnace 2 and to prevent impurities which are floating on the glass bath from reaching the chamber 6. In a similar arrangement, it may be desirable to combine the baffle 16 or 16' situated perpendicularly below the gather 13 with a drawing bar 12 comprising apertures 14 distributed over its entire length. However, it is advantageous to leave a passage 59 (FIGURE 4) between the baffle situated below the gather 13 and the wall 7'. The cross-sectional area of the said passage will be adapted to the quantity of molten material which is required to flow through the passage 59 in relation to the flow through the passage on the side of the wall 7.

Some of the compartments 17 which are remote from one another, the outermost compartments in the case of FIGURE 4, are connected together by an external covered channel 22 (FIGURES 4 and 6) and by apertures 23 and 24 formed in the wall 7 at the level of the subjacent bath 4, whereby it is possible to establish a closed circuit of molten material through the various compartments.

The barrier 20 descending from the roof 21 and dipping into the pool of glass may be situated downstream of the sill 3 (FIGURES 1 and 5), in the plane of the latter, or, in another embodiment illustrated in FIGURE 2, upstream of the sill. In the former case, the subjacent molten material extends into a part of the insulation in which there obtains the temperature of the furnace, while in the case of FIGURE 2 the trough 1 containing the molten material is distinctly separated from the furnace.

The molten material is set in motion by an appropriate propelling means, for example a screw 25 whose driving shaft 26 extends through the wall and is driven by a motor 27 comprising a variable-speed gear 28. The driving shaft 26 may be obliquely disposed and may advantageously extend through the roof 29 (FIGURE 7) of the channel 22 into a jacket 30 open at the bottom and comprising a pipe 31 for the introduction into the channel of an inert or reducing gas which maintains the atmosphere of the channel under a slight superatmospheric pressure. This prevents corrosion of the driving shaft by the air and at the same time oxidation of the molten material of the bath 4. The surface of this material may in addition be protected by a floating layer 32 of coke or graphite grains. In order to ensure an appropriate performance of the screw 25 rotating in an oblique plane, there may be provided in the channel 22 a barrier 60 disposed upstream of the screw.

Figure 15:
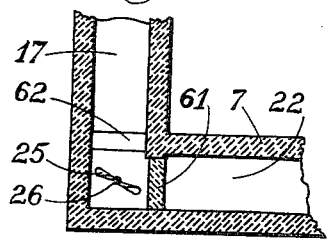
Figure 14:
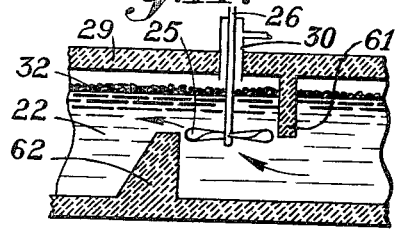

In a variant illustrated in FIGURE 14, the driving shaft 26 extends vertically through the roof 29 of the channel 22 into a jacket 30 as hereinbefore described, and the screw 25 turns in a horizontal plane, approximately mid-way of the height of the layer of molten material, between an upstream screen 61 extending downwards into the molten material to the level of the said plane and a downstream barrier 62 rising from the base of the channel to the said level. When the horizontal screw is installed in one end of the channel 22, for example in front of the aperture 24 (FIGURE 4), the latter does not extend below the horizontal plane of the screw and leaves a barrier 62 in front of the compartment 17 in the plane of the wall 7, while the screen 61 is disposed in the channel 22 at a right angle in relation to the barrier 62 (FIGURE 15).

In the arrangement illustrated in FIGURE 4 (in which the molten material of the bath 4 has been omitted for the sake of clarity of the drawing), the circulation of the molten material is effected in the direction of the arrows from the aperture 23 by way of the channel 22 to the aperture 24 and thereafter through the various compartments 17, if desired partly through the passage 59, so that the molten material, of which the sensible heat has been reduced by the expenditure of heat required for maintaining the molten glass downstream of the gather at the temperature of the glass upstream of the gather passes through the channel 22 and can be heated by the hot glass arriving from the furnace 2 and giving up heat in travelling towards the point of extraction.

FIGURE 9 illustrates a closed circuit in which the molten material of the bath 4 circulates in counter-current to the pool 5 of molten glass. In this way, the molten material becomes heated on successively encountering hotter and hotter glass, and the screw 25 disposed in a short external channel 33 propels the very hot molten material through the compartment 34 and the channel 22 to the compartments 35, 36 and 37 which are to be maintained at uniform temperature.

In the embodiment illustrated in FIGURE 10, the space occupied by the subjacent bath 4 is subdivided by the rib 38 into two parts, each of which comprises baffles 16 and 16', an external channel 22, 22' and a screw 25, one screw being mounted in a short channel 33 and the other in the channel 22'. In this case, the molten material is circulated in two independent circuits, of which the one closer to the furnace 2 is adjusted for gradually cooling the glass travelling towards the extraction zone, while the other serves to maintain the molten glass at uniform temperature in the glass extraction zone.

The invention is not only applicable to apparatus for the vertical drawing of glass into sheet form. The described apparatus may readily be combined with drawing apparatus of the Libbey-Owens type as illustrated in FIGURE 11, in which the drawn sheet 10 passes over a roller 39 and is thereafter directed to the annealing arch 40. As in such apparatus the depth of the molten glass pool 5 is fairly small, the stability of the gather 13 is maintained without a rib 12 (FIGURES 3 and 4) necessarily having to be provided which penetrates into the glass sheet, whereby great freedom is obtained in regard to the arrangement of the baffles 16 and 16'. The application of the principle of the invention to Libbey-Owens drawing apparatus makes it possible to obviate the disadvantages resulting from the processes generally employed for heating the "drawing pot" and even completely eliminating this heating.

The invention finds other applications outside the field of drawing glass into sheet form. The application to "feeders" which feed the apparatus for the automatic manufacture of pressed or blown glass articles is an example of this. As is known, these feeders, which are formed with an aperture 41 (FIGURES 12 and 13), permit the periodic downward flow of predetermined quantities of glass intended for fashioning, the aperture being alternately opened and closed by a plunger (not shown in the drawing). In this case also, the molten glass pool 5 coming from the furnace 2 must be appropriately cooled in passing over the sill 3 and travelling towards the extraction zone, in which its temperature must be maintained uniform exactly at the desired degree. For this purpose, there is advantageously provided a longitudinal baffle 42 extending through the cooling zone of the glass and a perpendicular baffle 43 at the end of the said zone, which causes the molten material of the subjacent bath 4 to pass through a short external channel 44 in which there is disposed a propelling member 45 driven by a motor 27 with a variable-speed gear 28. The baffle 42 defines, with the sill 3, a passage 46, and with the extraction zone 47 a passage 48 which is provided with a barrier 49 of adjustable height. The emerging extraction zone 47 of the subjacent bath 4 is surrounded on the side of the side walls 7 and 7' and on the side of the end wall 8 by a passageway 48' for the molten material. When the circulation is set up, some of the molten material is caused to travel around the zone 47 by way of the passageway 48' and to combine with the part which has come from the compartment 50 and has passed the barrier 49. All of the molten material passes through the aperture 51 into the channel 44 and the aperture 52 into the compartment 53, through which it flows in a direction opposite to that of the compartment 50. The quantity of molten material travelling through the passageway 48' can be adjusted by modifying the height of the barrier 49. In the described construction, there are again two closed circuits which are not, however, independent as in the case of FIGURE 10. In addition, it provides compartments of different widths, so that it is possible to vary the effect of the subjacent bath on the pool of glass by modifying the speed of circulation of the molten material at different points of the circuit.

The thermal conditioing of the glass by a judicious circulation of the subjacent bath can be completed by additional heating or cooling means acting directly on either of the liquid materials, preferably on the molten material of the subjacent bath.

Thus, it is possible to provide electrical heating resistors 54 (FIGURE 4) immersed in the bath 4, either at the passages between the two compartments 17 or in the lateral channels 22 or at any other point at which the temperature of the glass pool 5 is likely to be too low. In addition, the metallic molten material may be used in known manner as a heating resistance between two electrodes introduced into the bath, or additional heating may be effected by means of ducts 55 of hairpin form through which a hot fluid is passed. The additional local heating may also be effected by means of a gas burner 57 (FIGURE 8) heating the interior of a casing 58 closed at one end and extending through a wall of the trough or of a lateral channel. Ducts identical to the ducts 55 may also serve for cooling the bath 4 at points at which the pool 5 is too hot, by the passage therethrough of a cooling fluid. In all cases, an appropriate number of thermocouples 56 are immersed in the bath 4 and in the glass pool 5 at the desired points for controlling the temperature.

Of course the invention is not limited to the embodiments described and illustrated by way of example, and modifications may be made thereto without departing from its scope.

I claim:

1. The method of manufacturing glass products which comprises forming in a working chamber having a given area for a pool of molten glass of substantial thickness and from an interior extraction zone of which a product is pulled out of at a given working temperature, a bath in said working chamber supporting said glass pool and composed of a molten metal having a melting point substantially lower than the temperature at which the glass is to be maintained in the chamber, high thermal conductivity and inertness to the glass, the metal bath being formed so that it has a pool supporting surface throughout the extent of which said bath is of a thickness enabling the production of heat transfer circulatory movement, flowing molten glass directly from a furnace to a part of the metal bath at the entry end of said working chamber and over said metal bath toward said interior extraction zone, agitating said bath of molten metal internally to create a movement therein capable of redistributing the heat of said glass pool to provide a substantially uniform temperature in said interior extraction zone of the glass pool, and guiding such movement of the molten metal to cause it to flow in substantially the same plane in channels forming at least one closed circuit of flow having a tortuous course, and so that such guided flow extends throughout said given area within which is located said interior extraction zone, whereby the heat extracted by the guided flow of molten metal from the hotter portions of said glass pool as it recirculates through such tortuous course, is redistributed to the cooler portions of said glass pool so as to produce in said interior extraction zone of molten glass a substantially uniform temperature.

2. The method according to claim 1, including the step of changing the heat content of the molten material in said metal bath at a given place in the circulatory movement therein to modify the heat exchange between the molten glass and such molten metal material.

3. The combination with a furnace for melting glass, of a working chamber of given area for a pool of molten glass of substantial thickness and from an interior extraction zone of which a product is pulled out of at a given working temperature, said working chamber being separated at one end from the furnace by a transverse partition rising from the floor of the chamber to a height below the level of the molten glass flowing from the furnace into said chamber, said working chamber having end and side walls defining with said partition a receptacle of said given area, a bath in said receptacle supporting said glass pool and composed of a molten metal having a melting point substantially lower than the temperature at which the glass is to be maintained in the chamber, high thermal conductivity and inertness to the glass, the metal bath being formed so that it has a pool supporting surface throughout the extent of which said bath is of a thickness enabling the production of heat transfer circulatory movement, the molten glass from the furnace flowing over said transverse partition and over said metal bath toward said interior extraction zone, means for pulling out a glass product from the thus supported glass pool at said interior extraction zone thereof, means for agitating said bath of molten metal internally to create a movement therein capable of redistributing the heat of said glass pool to provide a substantially uniform temperature in said interior extraction zone of the glass pool, and means for guiding such movement of the molten metal to cause it to flow in substantially the same plane in channels forming at least one closed circuit of flow having a tortuous course, and so that such guided flow extends throughout said given area within which is located said interior extraction zone, whereby the heat extracted by the guided flow of molten metal from the hotter portions of the glass pool as it recirculates through such tortuous course, is redistributed to the coller portions of said glass pool so as to produce in said interior extraction zone of molten glass a substantially uniform temperature.

4. Apparatus according to claim 3 in which said guiding means comprises a plurality of baffles mounted on the base of said working chamber and extending upwardly through said metal bath to levels above the upper surface of said metal bath.

5. Apparatus according to claim 4, in which one of said guiding baffles is located in said extraction zone and extends upwardly into said pool of molten glass to a level short of the upper surface of the glass pool to enable it to function as a drawing bar, and means overlying said drawing bar for drawing the molten glass from the glass pool into sheet form.

References Cited by the Examiner

UNITED STATES PATENTS

| | | | |
|---|---|---|---|
| 710,357 | 9/1902 | Heal | 65—182 X |
| 789,911 | 5/1905 | Hitchcock | 65—182 |
| 810,865 | 1/1906 | Hoover et al. | 65—182 |
| 887,623 | 5/1908 | Gobbe | 65—258 X |
| 1,564,240 | 12/1925 | Hitchcock | 65—182 X |
| 1,810,920 | 6/1931 | Mambourg | 65—195 X |
| 1,810,980 | 6/1931 | Nobbe | 65—195 X |
| 1,815,473 | 7/1931 | Harding et al. | 65—193 X |
| 1,841,715 | 1/1932 | Cone | 65—195 |
| 1,920,118 | 7/1933 | Walsh et al. | 65—182 |
| 2,198,304 | 4/1940 | Cornelius | 65—134 X |
| 2,230,608 | 2/1941 | Canfield | 65—134 |
| 2,298,348 | 10/1942 | Coxe. | |
| 3,031,275 | 4/1962 | Shockley | 65—182 |
| 3,127,261 | 3/1964 | Long | 65—182 X |

FOREIGN PATENTS

| | | |
|---|---|---|
| 403,033 | 12/1941 | Great Britain. |
| 769,692 | 3/1957 | Great Britain. |
| 1,252,799 | 12/1960 | France. |
| 1,259,060 | 12/1960 | France. |

DONALL H. SYLVESTER, *Primary Examiner.*